United States Patent
Akimoto (10) Patent No.: US 7,891,082 B2
(45) Date of Patent: Feb. 22, 2011

(54) METHOD OF MANUFACTURING COIL ASSEMBLY UNIT FOR ROTARY ELECTRIC MACHINE

(75) Inventor: Akito Akimoto, Kariya (JP)

(73) Assignee: Denso Corporation, Kariya (JP)

( * ) Notice: Subject to any disclaimer, the term of this patent is extended or adjusted under 35 U.S.C. 154(b) by 156 days.

(21) Appl. No.: 12/427,207

(22) Filed: Apr. 21, 2009

(65) Prior Publication Data

US 2009/0260222 A1 Oct. 22, 2009

(30) Foreign Application Priority Data

Apr. 21, 2008 (JP) ............................. 2008-110777

(51) Int. Cl.
*H01F 7/06* (2006.01)
(52) U.S. Cl. .................... 29/606; 29/602.1; 29/605; 29/603.26; 242/365.3; 242/365.6; 242/365.8; 242/366; 242/328; 310/179; 310/187; 310/198; 310/199; 310/201
(58) Field of Classification Search ................ 29/602.1, 29/605, 606, 603.24, 603.26; 242/166, 328, 242/329, 365.3, 365.5, 365.8, 366; 310/179, 310/187, 198, 199, 201, 210
See application file for complete search history.

(56) References Cited

U.S. PATENT DOCUMENTS

| 6,376,961 | B2 | 4/2002 | Murakami et al. |
| 6,951,054 | B2 | 10/2005 | Hirota et al. |
| 7,337,525 | B2 | 3/2008 | Ueda et al. |
| 7,644,905 | B2 * | 1/2010 | Ogata et al. ......... 254/134.3 CL |
| 2001/0019234 | A1 | 9/2001 | Murakami et al. |
| 2004/0040142 | A1 | 3/2004 | Hirota et al. |
| 2004/0207282 | A1 | 10/2004 | Ueda et al. |
| 2006/0005376 | A1* | 1/2006 | Hirota et al. .................. 29/605 |
| 2007/0180682 | A1 | 8/2007 | Ueda et al. |

FOREIGN PATENT DOCUMENTS

| JP | 2002-176752 | 6/2002 |
| JP | 2004-104841 | 4/2004 |
| JP | 2005237167 A * | 9/2005 |
| JP | 3982446 | 7/2007 |

* cited by examiner

*Primary Examiner*—Paul D Kim
(74) *Attorney, Agent, or Firm*—Nixon & Vanderhye PC (57) ABSTRACT

A method of manufacturing a coil assembly unit comprises steps of coil forming, weaving, compressing steps. In the forming step, each coil wire is formed which provides linear portions and turn portions each connecting linear portions, during which bent portions are formed at both ends of each linear portion, the bent portions being bent so that mutually adjacent linear portions are deviated from each other. In the weaving step, the coil wires are mutually woven in turn, in which the turn portions intersect in turn. All the coil wires are subjected to the weaving step in turn to produce a woven coil assembly. In the compressing step, the woven coil assembly is compressed by compressing the woven coil so that each bent portion is deformed to be linear to allow the mutually adjacent linear portions to come closer to each other, thus producing the coil assembly unit.

11 Claims, 10 Drawing Sheets

APPROXIMATELY 3m

(COIL FORMING STEP)

(COIL WEAVING STEP)

(AMOUNT OF CHANGE IN WEAVING ANGLE $\theta$)

FIG.15
(IN CASE OF OPENING ANGLE α OF 0 DEGREE)

FIG.16
(IN CASE OF OPENING ANGLE α OF 25 DEGREES)

METHOD OF MANUFACTURING COIL ASSEMBLY UNIT FOR ROTARY ELECTRIC MACHINE

CROSS-REFERENCE TO RELATED APPLICATION

This application is based on and claims the benefit of priority from earlier Japanese Patent Application No. 2008-110777 filed Apr. 21, 2008, the description of which is incorporated herein by reference.

BACKGROUND OF THE INVENTION

1. Technical Field of the Invention

The present invention relates to a method of manufacturing a coil assembly unit for a rotary electric machine.

2. Related Art

In general, rotary electric machines, such as motors, generators, and motor generators, need coil assembly units in which coil wires are assembled together to induce current therethrough or generate a magnetic field by supplying current therethrough. To manufacture such coil assembly units, there have been known various manufacturing methods.

For example, Japanese Patent Laid-open Publication No. 2002-176752 discloses one manufacturing method, in which a pair of plate-like winding cores, which are located to be opposed to each other, is used to wind a plurality of coil wires at the same time. Another manufacturing method is disclosed by Japanese Patent Laid-open Publication No. 2004-104841, in which two coils are laced with each other. Practically, in a winding step, the first coil wire is formed into a triangular-waveform coil wire, and in the next step, the second coil wire is turned 90 degrees around the axis thereof during which time the second coil wire is made to advance in the direction along the first coil wire so that an overlapped portion between both coil wires increases by half of one turn. In the next step, the second coil wire is further turned 90 degrees around the axis thereof. Repeating these steps allows the second coil wire to be sequentially woven with the first coil wire by half of the one turn.

As other methods of mutually weaving (i.e., combining, lacing, plaiting, or twining) a plurality of coil wires each having a plurality of turns, the following method can be conceived of. For example, as is performed by known weaving machines, there are known various weaving methods. One method is that another coil wire is rotated around a fixed coil wire, during which time the rotated coil wire is shifted in the longitudinal direction of the fixed coil wire by one coil pitch. Another method is that two coil wires are held to be mutually open from their initial woven portions by a given opening angle, and then mutually woven so that the two coil wires are mutually rotated around the counterpart.

However, to avoid interference between turn portions of the woven coil wires, these methods require that an angle made between the axis lines of the two coil wires be increased. This will thus lead to a problem that the coil wires are likely to deform. Especially, when it is required to manufacture a coil assembly unit for motors having a longer axial length, such deformations may be larger when being woven, because each coil wire has a longer straight portion being accommodated in each slot. If the coil wires are deformed when being woven, the woven coils are also resulted in having distorted shapes, whereby it is difficult to provide coil assembly units with precision.

In addition, the foregoing conceivable weaving methods still have another problem that the coil wires should be rotated at larger angles, resulting in being larger the size of the manufacturing devices. Hence, the manufacturing cost of the devices become higher and it is difficult to manufacture coil assembly units at higher speed.

SUMMARY OF THE INVENTION

The present invention has been made in consideration of the foregoing various problems encountered by the conventional manufacturing methods, and the object of the present invention is to provide a method of manufacturing a coil assembly unit for rotary electric machines, which causes less deformation to the coils and which allows a smaller-size device to weave coil wires at higher speed.

In order to achieve the above object, the present invention provides a method of manufacturing a coil assembly unit for a rotary electric machine by mutually weaving (i.e., combining, lacing, plaiting, or twining) a plurality of coil wires each having a plurality of linear so portions being accommodated in slots and a plurality of turn portions each connecting mutually adjacent linear portions among the linear portions, the method comprising steps of: a coil forming step of forming each of the coil wires, in which bent portions are formed at both ends of each of the linear portions formed along each of the coil wires, the bent is portions being bent so that the mutually adjacent linear portions are deviated from each other; a coil weaving step of mutually weaving the plurality of formed coil wires in turn, in which, at one end of each of a pair of the formed coil wires, a pair of the turn portions of the formed coil wires are made to intersect to each other and the other ends of the pair of the formed coil wires are held to keep an angle between axis lines of the paired formed coil wires within a predetermined angular range, and in this held state, at least one of the paired formed coil wires is rotated so that the turn portions of the paired formed coil wires intersect in turn, wherein all the plurality of formed coil wires are subjected to the weaving step in turn to produce a woven coil assembly; and a coil compressing step of compressing the woven coil assembly by compressing the woven coil so that each of the bent portions is deformed to be linear so as to allow the mutually adjacent linear portions to come closer to each other, thus producing the coil assembly unit.

In this manufacturing method, the coil forming step, the coil weaving step, and the coil compressing step are performed sequentially and repeatedly. In the coil forming step, the bent portions are formed at both ends of each of the linear portions so that the mutually adjacent linear portions are deviated from each other. Thanks to this deviation of mutually adjacent linear portions, both turn portions of the pair of formed coil wires can be weaved sequentially with each other without mutual interference when at least one of the formed coil wires is rotated or revolved in the coil weaving step. Thus, compared with liner portions with no bent portions, the angle between both axis lines of the pair of formed coil wires can be set smaller, leading to less deformation of the coil wires during the coil weaving step.

In the coil weaving step, the coil bent portions are deformed) to be linear (i.e., made straight) such that mutually adjacent linear portions come closer to each other. Since the bent portions are now deformed linearly and part of the liner portions that have come closer to each other, it is possible to have a woven coil assembly unit in which the linear portions are approximately parallel with each other, for example.

In this way, forming the bent portions allows the turn portions of a pair of formed coil wires to be woven with no spatial interference therebetween. In particular, when a large number of formed coil wires are subjected to the coil weaving step (for example, one coil wire is woven with five woven coil wires, two woven coil wires are woven with other two woven coil wires, or four woven coil wires are woven with other four woven coil wires), the width between mutually liner portions become narrower. Even in such a state, the bent portions are reliably avoided from being interfered with each other during the coil weaving step. This makes it possible to provide a smaller amount to the angel between both axis lines of a pair of formed coil wires, resulting in that there is less deformation of the coil wires in the coil weaving step.

In addition, when the coil weaving step is performed using a rotating device to rotate or revolve the coil wires, the rotating device can be made compact, thus contributing in lowering manufacturing the rotating device. Further, the smaller angle between both axis lines of a pair of formed coil wires gives compact rotating or revolving actions to the coil wires, the coil wires can be rotated or revolved faster, whereby the coil weaving step can be made faster.

DETAILED DESCRIPTION OF THE PREFERRED EMBODIMENTS

With reference to the accompanying drawings, embodiments of the present invention will now be described, in which how to manufacture a coil assembly for a rotary electric machine, according to the present invention, will now be described.

Figure 1A:
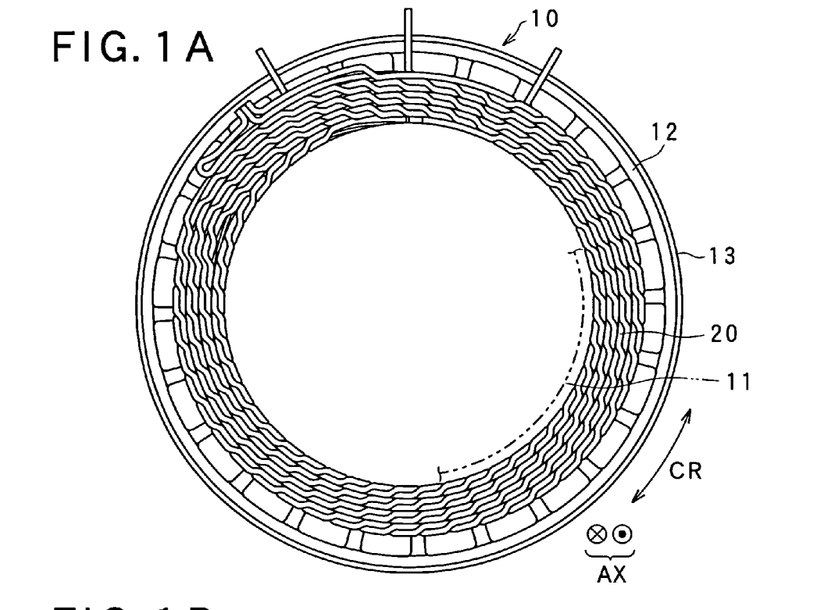
FIG. 1A is a plan view showing a stator for rotary electric machines, which stator adopts a coil assembly unit being manufactured by methods taught in embodiments according to the present invention.
Figure 1B:
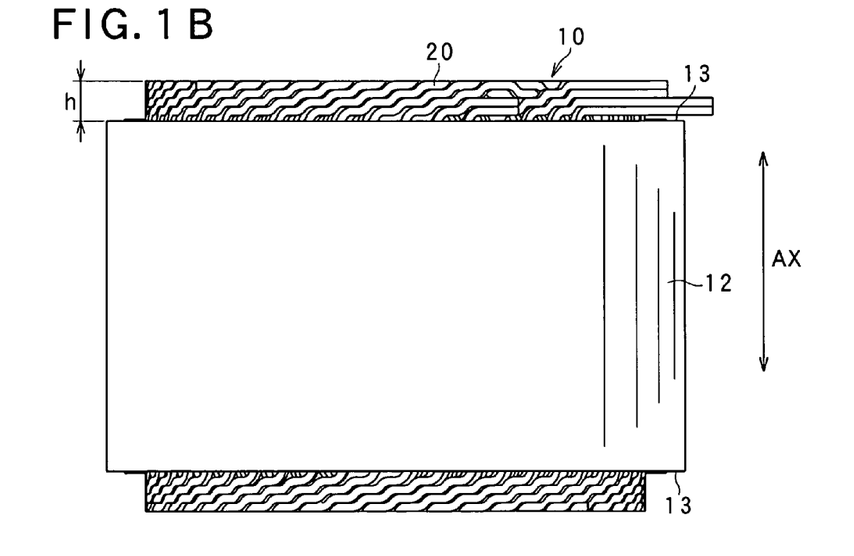
FIG. 1B is a side view showing the stator shown in FIG. 1A.

FIGS. 1A and 1B outline a rotor 10 for the rotary electric machine which is for example an alternator, a motor, or a motor generator for a vehicle. FIG. 1A shows a perspective view of the rotor 10, while FIG. 1B shows a side view of the rotor 10. This rotor 10 is manufactured with a coil assembly 20, which can be assembled based on various manufacturing methods provided various embodiments of the present invention.

The stator 10 shown in FIGS. 1A and 1B is used by, for example, a rotary electric machine called a motor generator for a vehicle, which works as an electric motor as well as a generator. The stator 10 has a bore in which a stator 11 is accommodated. Though not detailed, the rotor 11 has a plurality of magnetic poles of which two type of N and S magnetic polarities are alternate to each other in a circumferential direction of the rotor 11. In the rotor 11, the magnetic poles are located to face to the inner circumferential surface of the stator 10. The stator 10 is provided with a stator core 12. The stator core 12 is composed of magnetic steel plates of a predetermined thickness, which are stacked on one another in a direction which corresponds to an axial direction AX of the stator 10.

Figure 2:
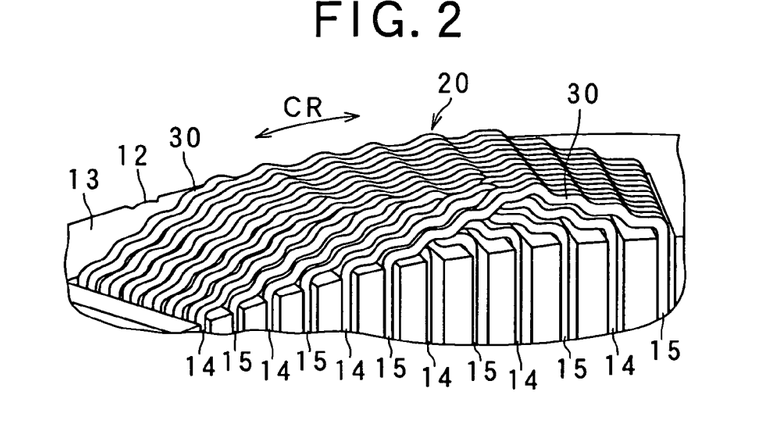
FIG. 2 is an enlarged perspective view showing a portion of the stator shown in FIGS. 1A and 1B.
Figure 3:
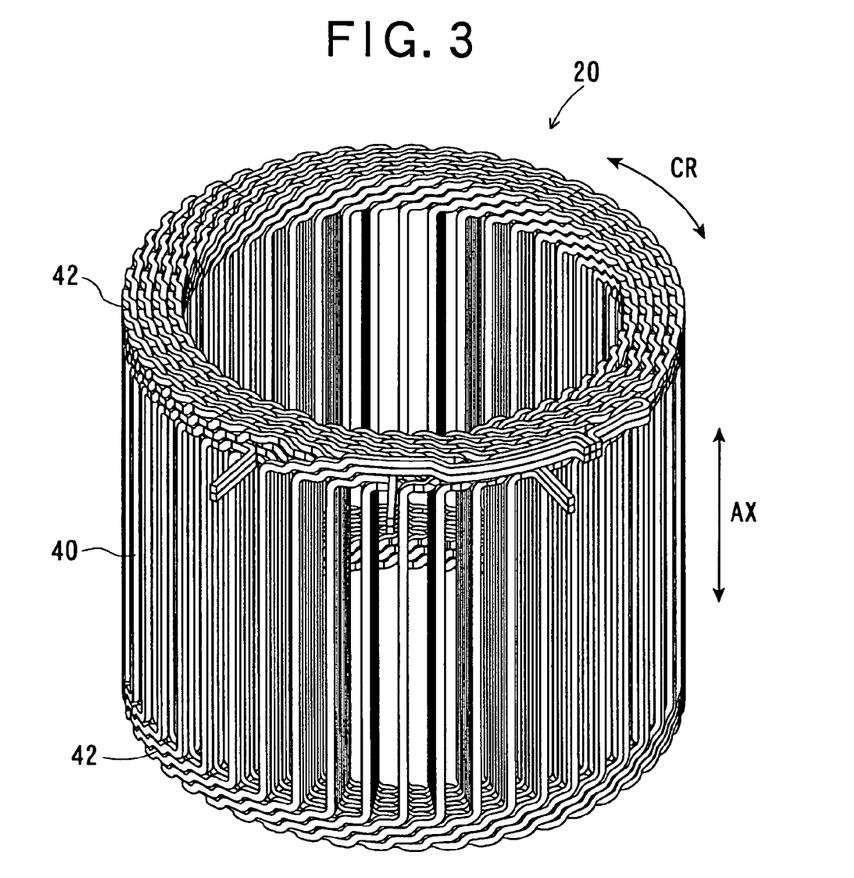
FIG. 3 is a perspective view showing the appearance of the coil assembly unit.
Figure 4:
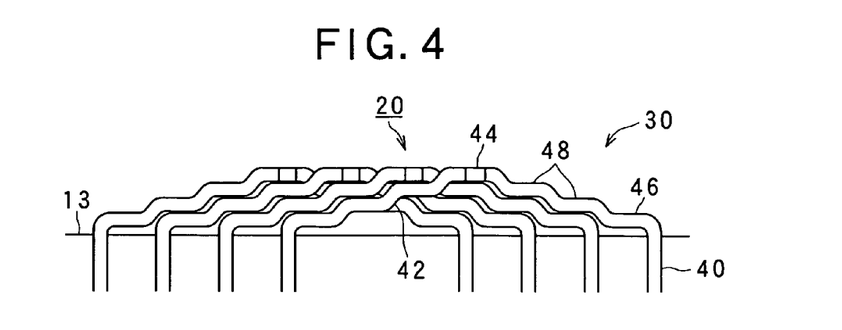
FIG. 4 is a side view showing a coil end portion of the coil assembly unit.

As shown in FIG. 2, the stator core 12 has a plurality of slots which are straight in the axial direction AX but mutually adjacent to each other, with predetermined pitches therebetween, in a circumferential direction CR orthogonal to the axial direction AX. The slots are formed to open to the inner circumferential surface of the stator core 12. The plurality of slots are composed of a plurality of paired mutually-adjacent slots 14 and 15.

A coil assembly 20 serves as stator windings composed of three-phase windings, and segments for the stator windings for each of the respective phases are embedded in each pair of the slots 14 and 15. The different-phase stator windings are embedded in three pairs of is slots 14 and 15 which are, pair by pair, mutually adjacent to each other in the circumferential direction.

With reference to FIGS. 3-7, the coil assembly unit 20 will now be detailed, which comprises coil wires 30 woven with each other. The woven coil wires 30 compose the coil assembly unit 30 with turn portions 42 at axially both ends thereof.

Figure 5:
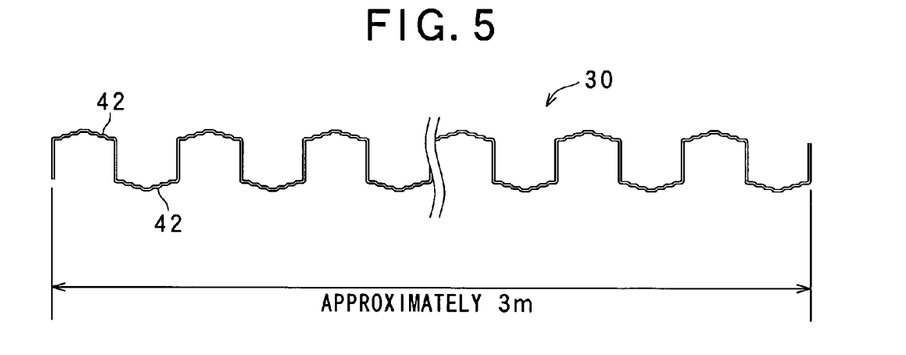
FIG. 5 is an illustration showing, in a developed form, the entire form of a coil wire woven into the coil assembly unit.
Figure 6:
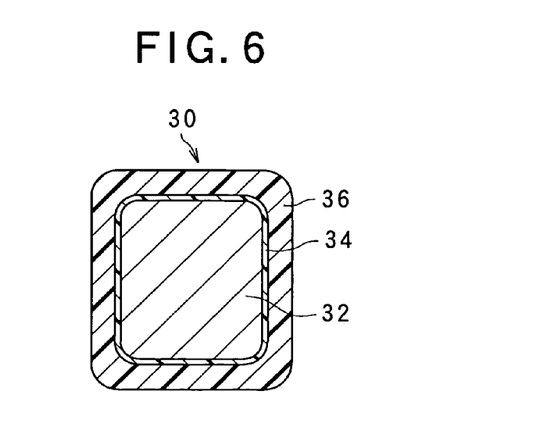
FIG. 6 is a sectional view of the coil wire

Each coil wire 30 of the coil assembly unit 20 is produced as shown in FIG. 5, where each coil wire 30 has a plurality of turn portions 42 located at predetermined pitches in the circumferential direction CR (FIG. 5 shows each coil wire 30 in an expanded form). One coil wire 30 has a length of approximately 3 m. As shown in FIG. 6, each coil wire 30 essentially consists of a copper-made conductor 32 and electrical insulating sheaths composed of an electrical insulating inner layer 34 covering the conductor 34 and an electrical insulating outer layer 36 covering the layer 34. The thickness of both the inner and outer layers 34 and 36 is set to be 100 to 200 μm. In this way, the insulating sheaths are thicker, so that it is not necessary to insert other electric insulating means, such as insulating papers, between the coil wires 30 when being stacked on one another.

As shown in FIG. 2, each of the respective coil wires 30 has linear coil portions 40 being accommodated in the slots 14 and 15 of the stator core 12 (hereinafter, if necessary, such coil portions 40 are called "slot-accommodated linear portions") and coil portions 42 located to protrude from the slots 14 and 15 in the axial direction AX (hereinafter, if necessary, such coil portions 42 are called "turn portions"). That is, each turn portion 42 is located outside of the stator core 12 to eclectically and physically connect both slot-accommodated linear portions embedded in differently allocated slots 14 (15) in the circumferential direction CR. As a wholes the coil wires 30 are wound in and around the stator core 12 in a wave winding form, thereby providing a stator winding, that is, the coil assembly unit 20. In effect, the turn portions 42 of the respective coil wires 30 are present on both axial sides of the stator core 12. Of the plurality of turn portions 42 of each coil wire 30, the odd-numbered turn portions and the even-numbered turn portions are alternately located at different circumferential positions whose phases are mutually shifted by an electrical angle of 180 degrees from each other.

Figure 7:
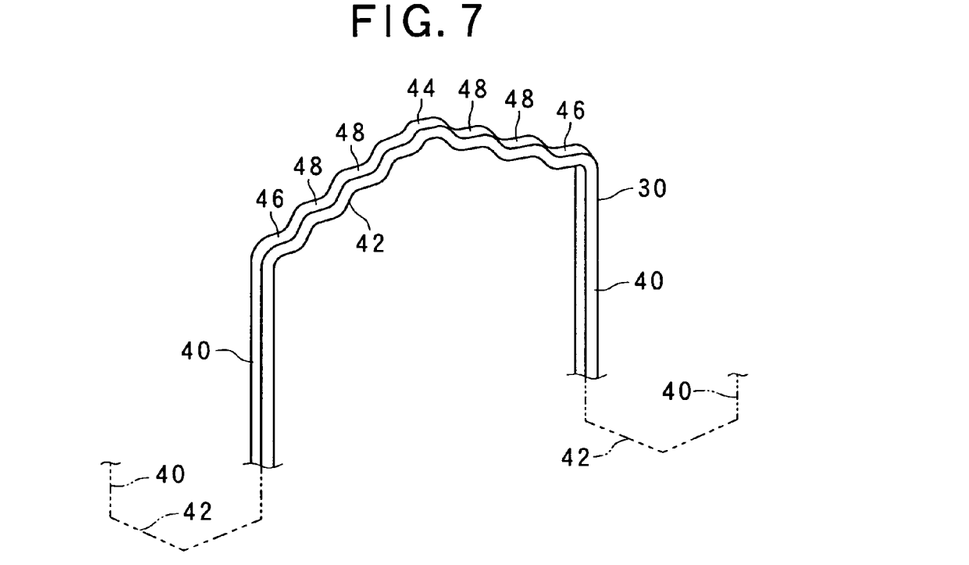
FIG. 7 is a partial perspective view showing the turn portion of a coil wire.

As shown in FIG. 7, each turn portion 42 has a crank part with no twisting at the center thereof. The crank part 44 is formed into a crank shape which is consistent with an axial end face 13 of the stator core 12.

Referring to FIGS. 8 to 13, how to manufacture the coil assembly unit 20 according to the present embodiment will now be described.

Figure 8:
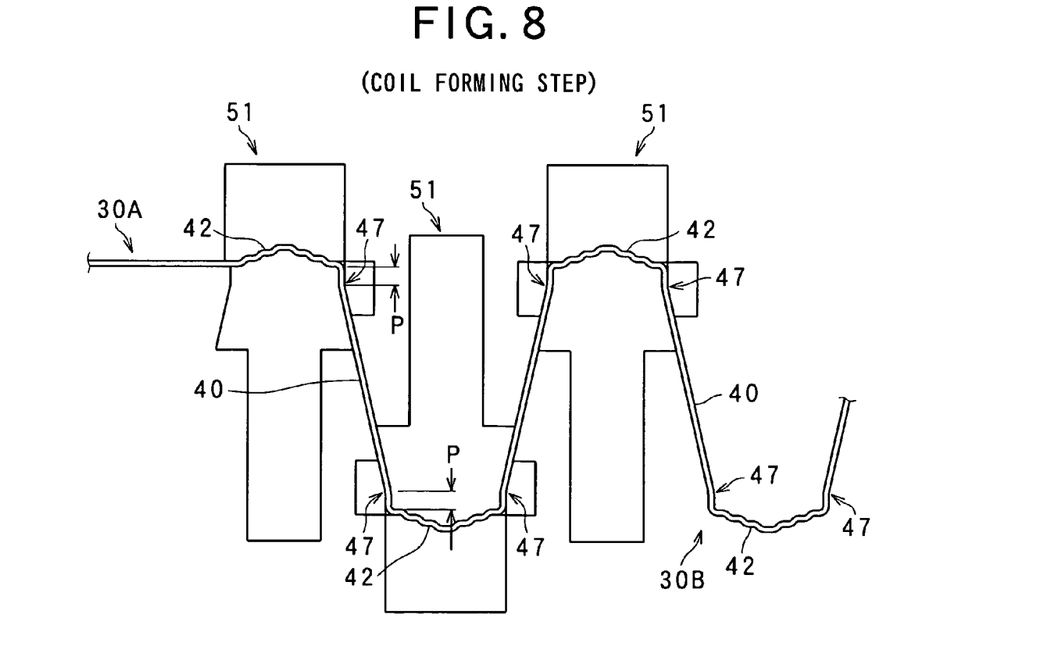
FIG. 8 is an illustration showing a coil forming step adopted by the manufacturing method according to the embodiment.

In the present embodiment, the manufacturing method for the coil assembly unit 20 includes a coil forming step, a coil weaving (i.e., combining, lacing, plaiting, or twining) step, and a coil compressing step, which are carried out in turn. As shown in FIG. 8, in the coil forming step, a forming die 51 is used to form a linear coil wire 30A into a formed coil wire 30B which has a predetermined shape. Each formed coil wire 30B has linear slot-accommodated linear portions 40 and step-wise turn portions, which are continuously, but alternately, connected to each other. More precisely, between each slot-accommodated linear portion 40 and each turn portion 42, there is formed a bent portion 47 that connects both coil portions 40 and 42.

Figure 9A:
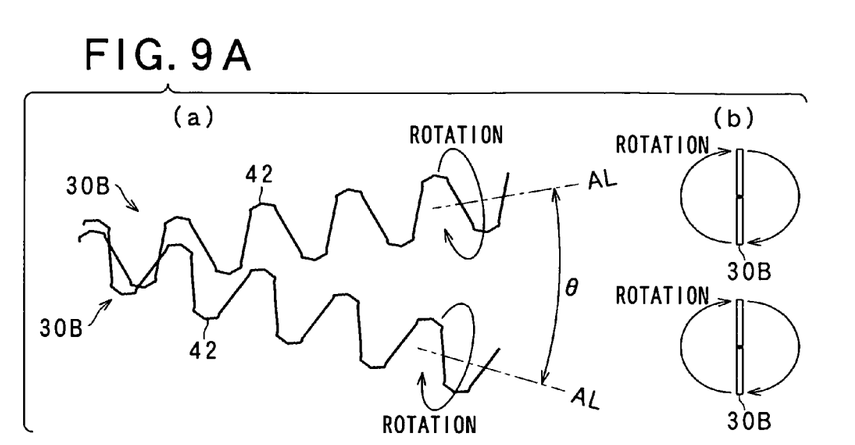
FIGS. 9A to 9C are illustrations each showing various weaving techniques in a coil weaving step employed in the manufacturing method.

Each bent portion 47 is bent to allow mutually-adjacent slot-accommodated linear portions 40 to step away from each other. Practically, concerning mutually-adjacent slot-accommodated linear portions 40 whose one ends are connected by one turn portion 42, the bent portions 47 are bent respectively so that the other ends of such mutually-adjacent slot-accommodated linear portions 40 are opened outward. In the present embodiment, an opening angle α (refer to FIG. 9) made between mutually-adjacent slot-accommodated linear portions 40 is set to 40 degrees. Each bent portion 47 is displaced from a corner at which one slot-accommodated linear portion 40 and one turn portion 40 intersects, thus unchanging the intersection angle of both coil portions 40 and 42 at the corner.

The bent angles of both bent portions 47 connected to both ends of each slot-accommodated linear portion 40 are set to the same value. Thus, two linear portions P, which can be regarded as part of turn portions directly connected to both ends of each slot-accommodated linear portion 40 respectively, are substantially parallel with each other. This permits the axis line of the formed coil wire 30B is not distorted, but straight. In addition, each slot-accommodated linear portion 40 has a length longer than the maximum interval between mutually-adjacent slot-accommodated linear portions 40. The odd-numbered turns 42 and the even-numbered turns 42 are alternately located at positions whose phases are mutually shifted by an electrical angle of 180 degrees around the axis line.

Next, the coil weaving step is carried out. In this step, as shown in FIG. 9A, a pair of formed coil wires 30B is arranged such that the turn portion 42 located at one end side of one coil wire intersects with that of the other coil wire. The intersecting ends are fixedly held by a rotating device (not shown), but the rotating device itself is rotatable with fixedly holding the intersecting ends in synchronism with the weaving rotation (revolution) later described. Concurrently, the other end sides of both formed coil wires 30B are held by the rotating device to keep an angle θ made between the axis lines AL of both formed coil wires 30B within a predetermined angular range (for example, in the present embodiment, approximately 15 degrees). Hereinafter this angle θ is referred to as a weaving angle.

From this arrangement, as shown in FIG. 9A, the rotating device is operated such that each coil wire of the paired formed coil wires 30B is rotated (revolved) in the same direction around each axis line, with the result that the respective turn portions 42 of one coil wire intersect with those of the other coil wire, in turn, from the turn portion 42 located at one end. This sequential intersection allows both formed coil wires 30B to be woven with each other.

Figure 9B:
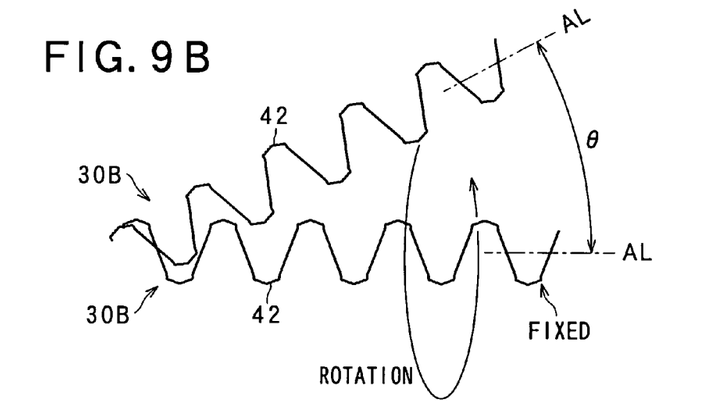
Figure 9C:
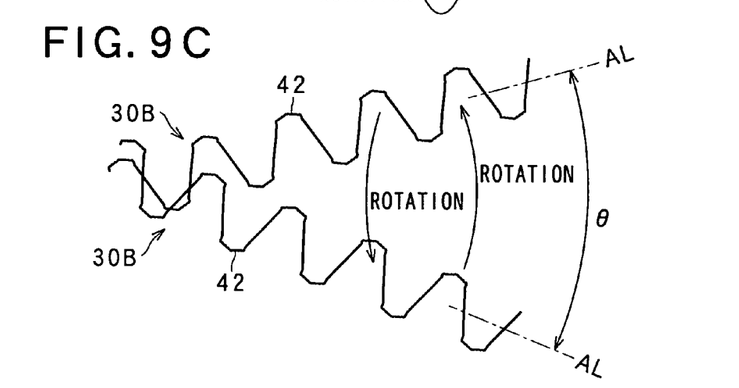

Alternatively, other weaving techniques which are illustrated in FIGS. 9B and 9C may be adopted selectively. In the case shown in FIG. 9B, one of the paired formed coil wires 30B is rotated (revolved) about the other of the paired formed coil wires 30B, which other coil wire is fixedly held. Furthermore in the case of FIG. 9C, the paired formed coil wires 30B are fixedly held so that one end of each of both coil wires intersects with each other at a predetermined weaving angle and, in this held state, each coil wire is rotated (revolved) around the other one.

Figure 10:
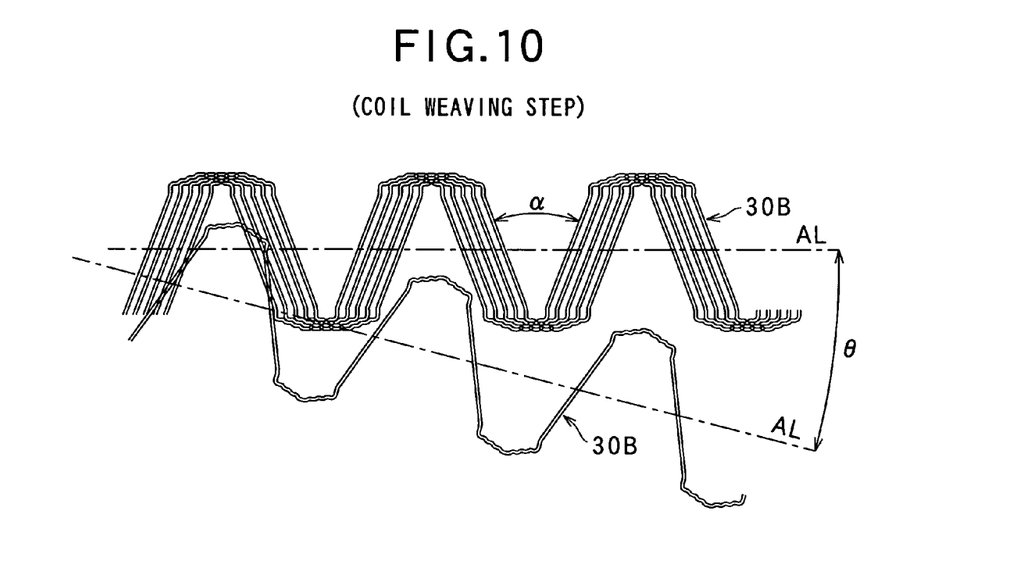
FIG. 10 is an illustration showing one weaving technique which can be employed in the coil weaving step.

In addition, each of the paired formed coil wires 30B is not limited to one coil wire, but can be composed of already woven two or more coil wires. Hence, in addition to the case where one-to-one paired coil wires are woven with each other, one-to-plural paired coil wires, plural-to-one paired coil wires, or plural-to-plural paired coil wires (each consisting of plural coil wires which are already woven) can be woven with each other. One such an example is shown in FIG. 10, where one coil wire is woven with five woven coil wires using any one of the weaving techniques shown in FIGS. 9A to 9C.

Figure 11:
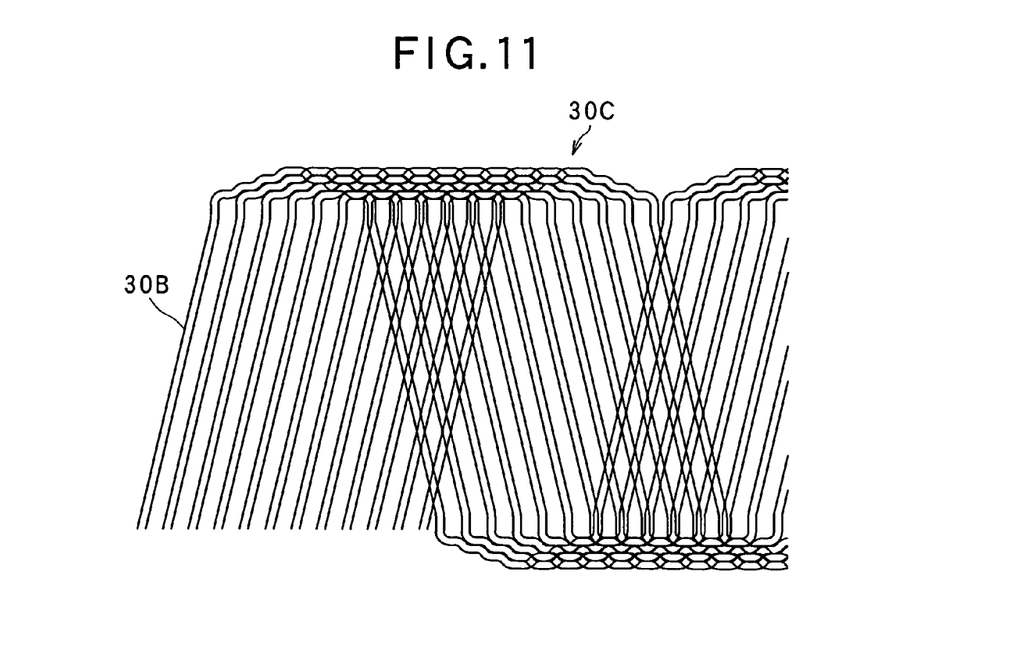
FIG. 11 is a side view showing part of woven coil wires produced after the coil weaving step.

The foregoing weaving process is carried out to provide a woven coil 30C in which, in total, for example, twelve formed coil wires 30B are woven together, as shown in FIG. 11.

Figure 12:
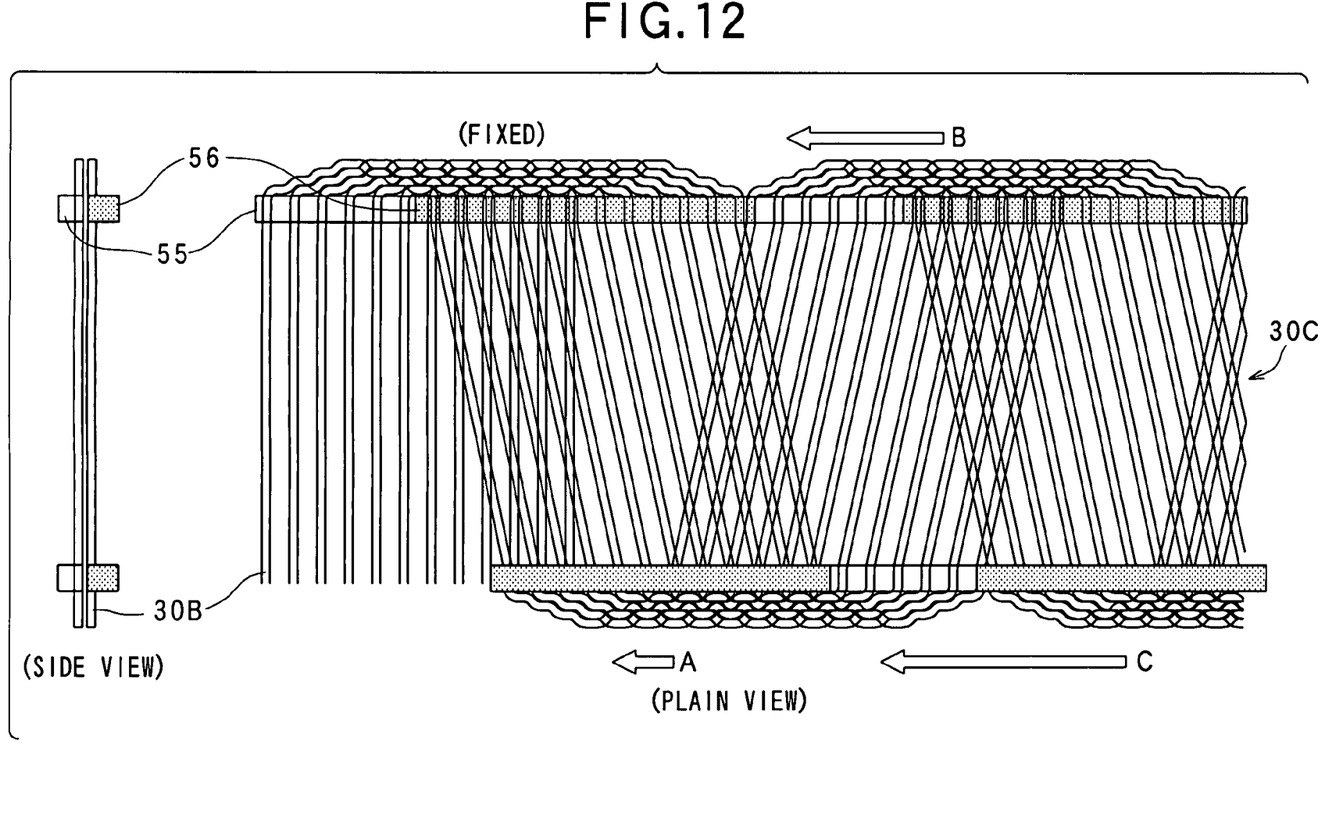
FIG. 12 is an illustration showing a coil compressing step for woven coil wires in the manufacturing method.

The coil compressing step is then carried out. In this step, as shown in FIG. 12, the woven coil 30C is processed such that the bent portions 47 on both sides of the respective slot-accommodated linear portions 40 are clamped by two coil holders 55 and 56. Then, the coil holders 55 and 56 are operated to bring the respective bent portions 47 into a linear form, during which time the group of the first turn portions, which are located at the leftmost end of the woven coil 30C in FIG. 12 are positionally fixed. Therefore, moving the coil holders 55 and 56 makes it possible to deform the respective bent portions 47 linearly. The mutually-adjacent slot-accommodated linear portions 40 can thus be deformed to come closer to each other.

Figure 13:
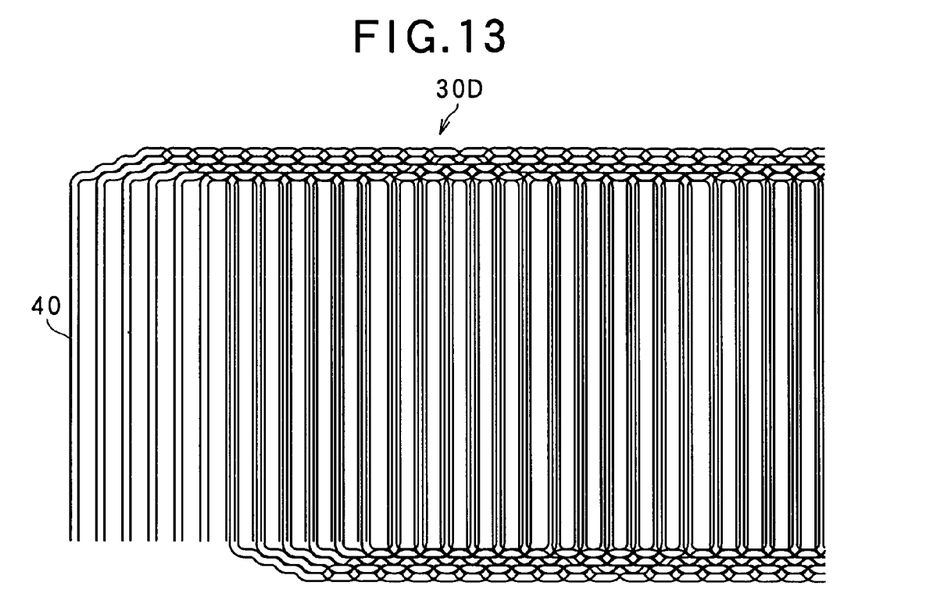
FIG. 13 is a developed view showing part of woven coil wires produced after the coil compressing step.

Hence, the second turn portions group A, the third turn portions group B, the fourth portions group C, and so on move leftward at the same time in the arrangement shown in FIG. 12. When it is assumed that the amount of movement of the second turn portions group A is 1 unit, that of the third turn portions group B and that of the fourth turn portions group C become 2 units and 3 units, respectively, i.e., 2 and 3 times the amount of movement of the group A portions respectively. As a result, as shown in FIG. 13, the slot-accommodated linear portions 40 are brought into a state where those portions 40 are linear and parallel with each other, providing a given form of woven coil unit 30D. The ends of the respective coil wires 30 of this woven coil unit 30D are joined at a plurality of points thereof and the entire unit 30D is shaped into a toroidal form, thus providing the coil assembly unit 20 shown in FIG. 3.

As stated, in the coil forming step, the bent portions 47 are arranged at both ends of each slot-accommodated linear portion 40 and bent to allow mutually adjacent linear portions 40 to step away from each other. The existence of these bent portions 47 eliminates spatial interference among the turn portions 42 of the formed coil wires 30B in the coil weaving step. Hence, the weaving angle θ can be made smaller, whereby deformation which may occur in weaving the formed coil wires 30B can be set minimized.

The rotating device used in the coil weaving step can be made smaller in size, thereby making the whole manufacturing apparatus (including the rotating device used in the coil weaving step) compact in size and reducing the whole cost of manufacturing. In addition, it is possible to reduce the range of rotation of the formed coil wires 30B. This makes the rotating action faster, so that the weaving step can be performed at higher speed.

In the present embodiment, the opening angle α made between mutually-adjacent slot-accommodated linear portions 40, which angle is set in the coil forming step, is larger than the weaving angle θ which is set in the coil weaving step. This means that making the opening angle α larger will lead to setting the weaving angle θ smaller. Hence, deformation of coil wires which will occur in weaving the formed coil wires 30B can be suppressed.

Figure 14:
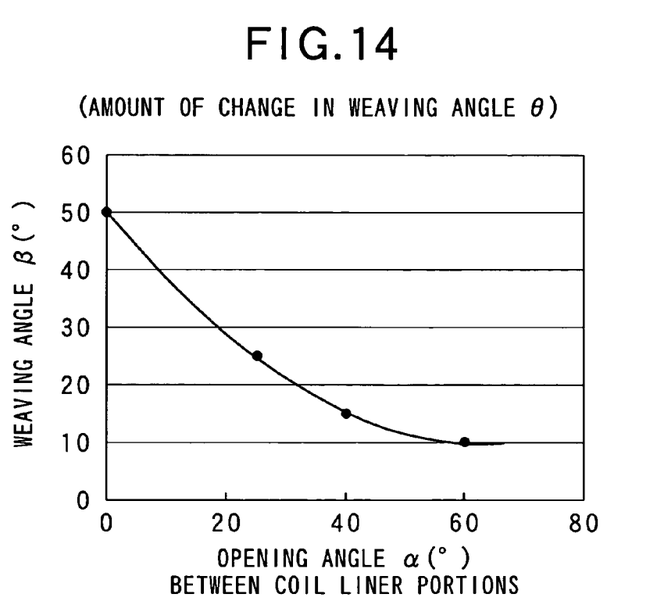
FIG. 14 is a graph showing the relationship between an opening angle $\alpha$ and a weaving angle $\theta$ exemplified in the embodiment.
Figure 15:
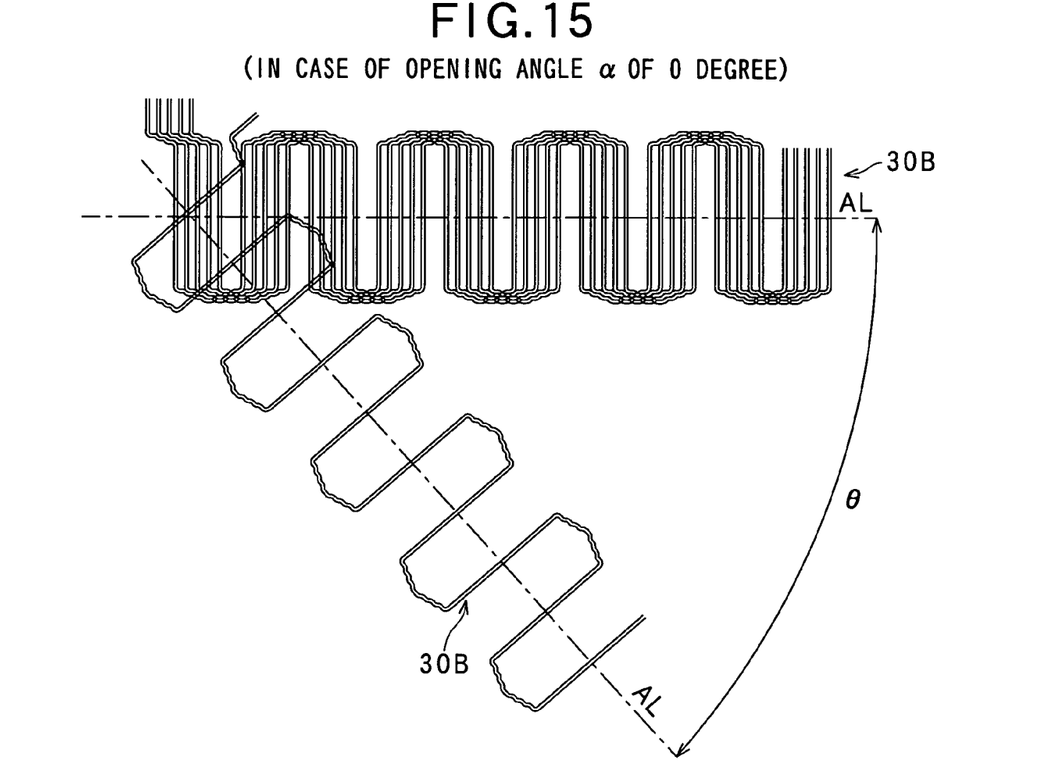
FIG. 15 illustrates woven coil wires for an opening angle $\alpha$ of 0 degrees.
Figure 16:
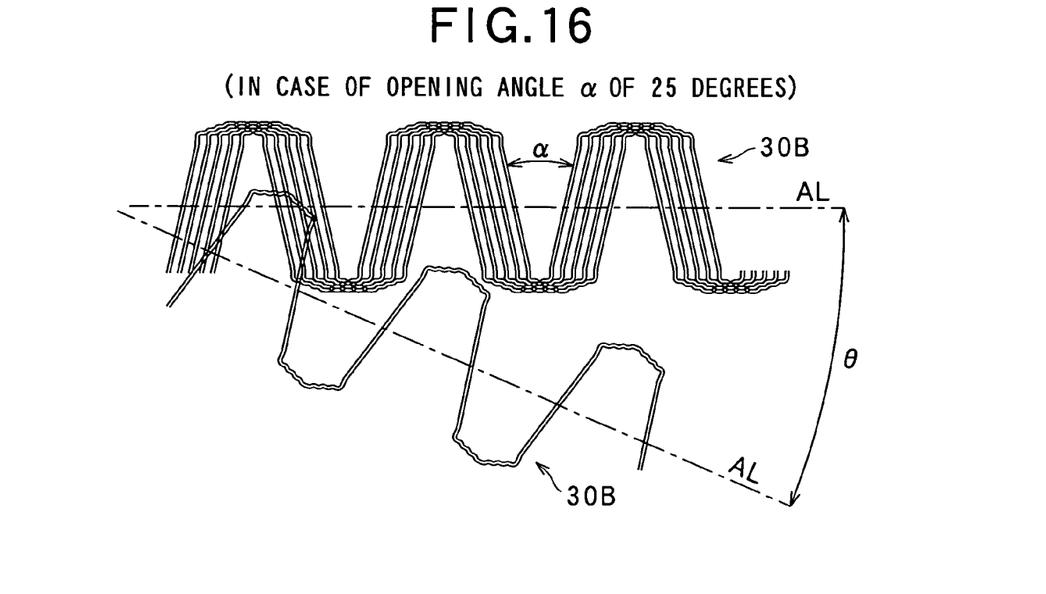
FIG. 16 illustrates woven coil wires for an opening angle $\alpha$ of 25 degrees.
Figure 17:
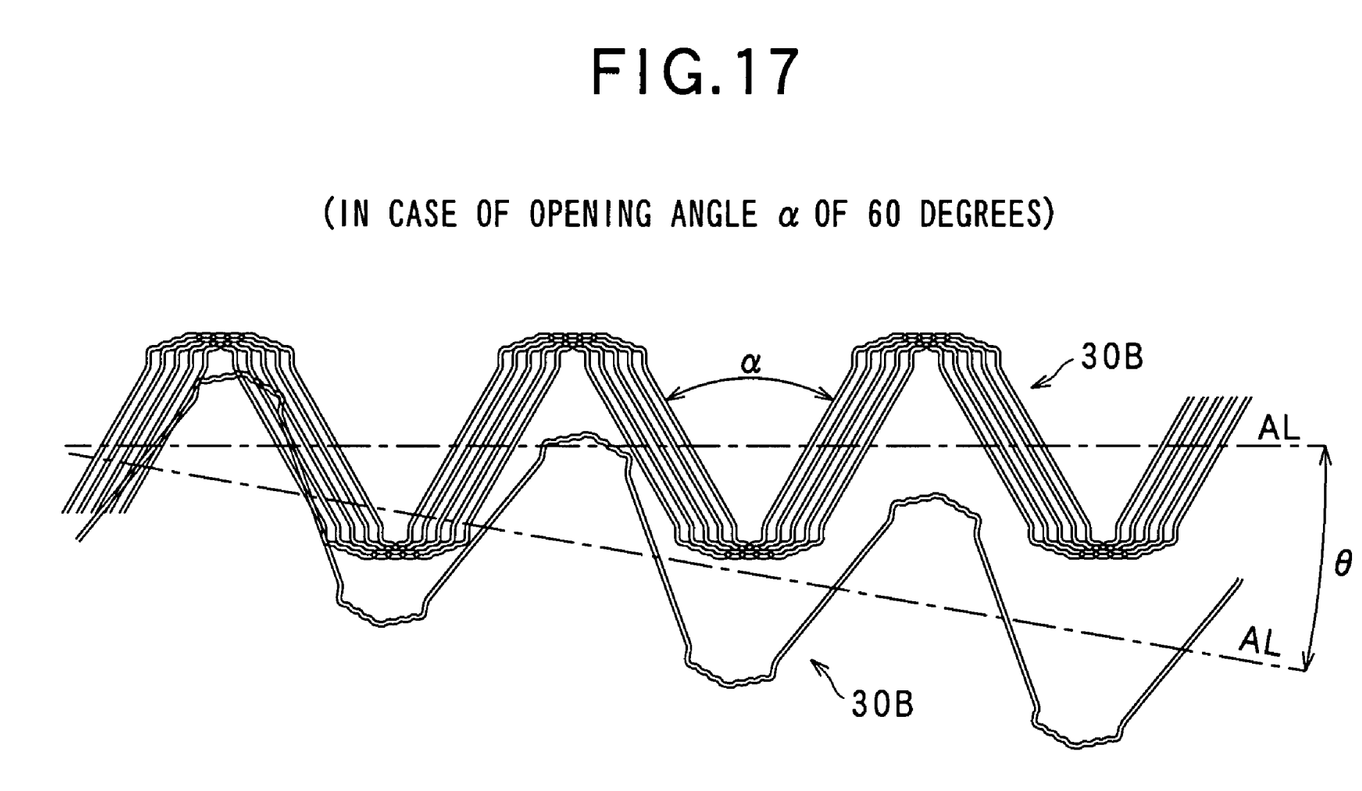
FIG. 17 illustrates woven coil wires for an opening angle $\alpha$ of 60 degrees.

The inventors used the coil wires 30B, which had been subjected to weaving in the coil weaving step, to examine the relationship between the opening angle α of the formed coil wires 30B and the weaving angle θ which is able to obviate spatial interference among the turn portions. This examination provided a result shown in FIG. 14. This result reveals that when the opening angle α is zero degrees as illustrated in FIG. 15, the weaving angle θ obviating the interference among the turn portions is 50 degrees. When the opening angle α is 25 degrees as illustrated in FIG. 16, the weaving angle θ obviating such interference is 25 degrees. Moreover, as stated in the foregoing embodiment, when the opening angle α is 40 degrees as illustrated in FIG. 10, the weaving angle θ obviating such interference is 15 degrees. When the opening angle α is 60 degrees as illustrated in FIG. 17, the weaving angle θ obviating such interference is 10 degrees.

Accordingly, it can be understood that the larger the opening angle α, the smaller the weaving angle θ. It is preferred that the ratio of the opening angle α to the weaving angle θ be equal to or less than 1.

In addition to the foregoing advantages, the present embodiment provides the following advantages.

Each coil wire 30 is equal to or longer in width than a distance between the mutually-adjacent slot-accommodated linear portions 40 of two of the plurality of formed coil wires. In this case, as the slot-accommodated liner portions are longer relative to the width between mutually-adjacent slot-accommodated linear portions, the spatial interference between the turn portions is easier to occur in the coil weaving step. However, in the present embodiment, even in such a condition, thanks to forming the bent portions 47, the foregoing advantage of preventing the deformation of the coil wires in the coil weaving step can be gained.

In addition, in the coil forming step, each of the respective bent portions 47 is formed as part of each of the slot-accommodated linear portions 40 and is displaced from a corner at which each of the slot-accommodated linear portions 40 intersects with each of the turn portions 42. Due to this displacement, it is possible to avoid the angle of each of the corners from changing during the formation of the bent portions 47. Therefore, in the coil compressing step, the angle of each of the corners can be kept as it is during deforming each of the bent portions 47 into a linear form in the coil compressing step. The deformation process can be made easier and also, the slot-accommodated liner portions can be made approximately parallel with each other in an easier manner.

Further, two of the bent portions 47 produced during the coil so forming step, which two bent portions are located at both ends of each of the linear portions, are bent at the same angle. Hence, the linear parts P (refer to FIG. 8) each connecting each bent portion 47 and each turn portion 42, which parts P are located on both end sides of each slot-accommodated liner potion 40, are approximately parallel with each other, making it easier to keep the axis line of each of the formed coil wires straight, without being curved.

In addition, the bent portions 47 are formed so that an opening angle α made between the mutually-adjacent slot-accommodated linear portions 40 produced during the coil forming step is equal to or larger than an angle θ (called a weaving angle) made between the axis lines of the paired formed coil wires 30B produced during the coil weaving step. In this case, by making the opening angle α larger, the weaving angle θ which is set in the coil weaving step can be made smaller. This is effective in suppressing the deformation of coil wires in the coil weaving step.

The coil assembly unit manufactured according to the present invention can be used by, for example, a rotary electric machine provided with a stator and a rotor located inside or outside the stator and formed with a plurality of magnetic poles arranged alternately in the circumferential direction. In this rotary electric machine, the coil wire 30A, whose section is almost rectangular, is wound in a plurality of slots of the stator core so as to compose a multiple-phase stator winding. The coil wire 30A is formed to have the slot-accommodated linear portions 40 and the turn portions 42 connecting linear portions 40 and protruding from the slots 14, 15. Each of the turn portions 42 has a crank part 44, so that each of the turn portions 42 protruded from slots 14 and 15 is composed of the crank part 44. The crank part 44 is arranged at an approximately central part of each turn portion 42 and may not be twisted as stated in the foregoing embodiment. Alternatively, the central part in which the crack part 44 is formed may be cranked, in the circumferential direction CR when being assembled into the rotary electric machine, to have a cranked amount approximately corresponding to the width of the coil wire 30A. The coil wire 30A may be continuous throughout the stator core.

The present invention may be embodied in several other forms without departing from the spirit thereof. The embodiments described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A method of manufacturing a coil assembly unit for a rotary electric machine by mutually weaving a plurality of waveform coil wires each having a plurality of linear portions being accommodated in slots and a plurality of turn portions each connecting adjacent linear portions among the linear portions, the method comprising steps of:
   a coil forming step of forming each of the coil wires, in which bent portions are formed at both ends of each of the linear portions formed along each of the coil wires, the bent portions being bent so that the mutually adjacent linear portions are stepped away from each other;

a coil weaving step of mutually weaving the plurality of formed coil wires in turn, in which, at one end of each of a pair of the formed coil wires, a pair of the turn portions of the formed coil wires are made to intersect to each other and the other ends of the pair of the formed coil wires are held to keep an angle between axis lines of the paired formed coil wires within a predetermined angular range, and in this holding state, at least one of the paired formed coil wires is rotated around the axis line so that the turn portions of the paired formed coil wires intersect in turn, wherein all the plurality of formed coil wires are subjected to the weaving step in turn to produce a weaved coil assembly; and a coil compressing step of compressing the weaved coil assembly by compressing the weaved coil so that each of the bent portions is deformed to be linear in relation to each of the linear portions so as to allow the mutually adjacent linear portions to come closer to each other, thus producing the coil assembly unit.

2. The method of claim 1, wherein each coil wire is equal to or longer in width than a distance between the mutually adjacent linear portions of two of the plurality of formed coil wires.

3. The method of claim 2, wherein in the coil forming step, each of the respective bent portions is formed as part of each of the linear portions and is apart from a corner at which each of the linear portions intersects with each of the turn portions.

4. The method of claim 2, wherein two of the bent portions produced during the coil forming step, which two bent portions are located at both ends of each of the linear portions, are bent at the same angle.

5. The method of claim 2, wherein the bent portions are formed so that an opening angle made between the mutually adjacent linear portions produced during the coil forming step is equal to or larger than an angle made between the axis lines of the paired formed coil wires produced during the coil weaving step.

6. The method of claim 1, wherein in the coil forming step, each of the respective bent portions is formed as part of each of the linear portions and is displaced from a corner at which each of the linear portions intersects with each of the turn portions.

7. The method of claim 6, wherein two of the bent portions produced during the coil forming step, which two bent portions are located at both ends of each of the linear portions, are bent at the same angle.

8. The method of claim 6, wherein the bent portions are formed so that an opening angle made between the mutually adjacent linear portions produced during the coil forming step is equal to or larger than an angle made between the axis lines of the paired formed coil wires produced during the coil weaving step.

9. The method of claim 1, wherein two of the bent portions produced during the coil forming step, which two bent portions are located at both ends of each of the linear portions, are bent at the same angle.

10. The method of claim 9, wherein the bent portions are formed so that an opening angle made between the mutually adjacent linear portions produced during the coil forming step is equal to or larger than an angle made between the axis lines of the paired formed coil wires produced during the coil weaving step.

11. The method of claim 1, wherein the bent portions are formed so that an opening angle made between the mutually adjacent linear portions produced during the coil forming step is equal to or larger than an angle made between the axis lines of the paired formed coil wires produced during the coil weaving step.

* * * * *